US011237026B2

(12) United States Patent
Bohlin et al.

(10) Patent No.: US 11,237,026 B2
(45) Date of Patent: Feb. 1, 2022

(54) INSPECTION SYSTEM FOR CABLE, PIPE OR WIRE TRANSITS

(71) Applicant: Roxtec AB, Karlskrona (SE)

(72) Inventors: Jens Bohlin, Karlskrona (SE); Jörgen Landqvist, Karlskrona (SE); Ulf Hildingsson, Nättraby (SE)

(73) Assignee: Roxtec AB, Karlskrona (SE)

( * ) Notice: Subject to any disclaimer, the term of this patent is extended or adjusted under 35 U.S.C. 154(b) by 404 days.

(21) Appl. No.: 15/555,012

(22) PCT Filed: Mar. 1, 2016

(86) PCT No.: PCT/SE2016/050157
§ 371 (c)(1),
(2) Date: Aug. 31, 2017

(87) PCT Pub. No.: WO2016/140613
PCT Pub. Date: Sep. 9, 2016

(65) Prior Publication Data
US 2018/0031396 A1    Feb. 1, 2018

(30) Foreign Application Priority Data
Mar. 3, 2015    (SE) .................................... 1550249-5

(51) Int. Cl.
*G01D 9/00*      (2006.01)
*G06Q 50/06*   (2012.01)
(Continued)

(52) U.S. Cl.
CPC .......... *G01D 9/005* (2013.01); *G01M 99/008* (2013.01); *G06K 17/0022* (2013.01);
(Continued)

(58) Field of Classification Search
CPC ..................................................... G01D 9/005
See application file for complete search history.

(56) References Cited

U.S. PATENT DOCUMENTS 6,442,542 B1 *   8/2002   Ramani ............. G01R 31/2846
                                                                706/47
7,403,122 B1 *   7/2008   Koepp ............... G06K 19/0723
                                                                340/10.1
(Continued)

FOREIGN PATENT DOCUMENTS

CN          202024734 U      11/2011
CN          102308449 A       1/2012
(Continued)

OTHER PUBLICATIONS

Shimomura, JP 2007248336 (Year: 2007).*
(Continued)

*Primary Examiner* — Hyun D Park
(74) *Attorney, Agent, or Firm* — Merchant & Gould P.C.

(57) ABSTRACT

Disclosed is an inspection system for a cable, pipe or wire transit having a plurality of transit elements in a sealed installation of cables, pipes or wires at a site. A portable inspection device has a controller and an RFID interface. The transit has an RFID chip with a first memory area which stores an identity of the transit, and a second memory area. The controller reads the identity of the transit via the RFID interface, records detailed operational integrity status data of the transit elements, obtains a status indication representing an assessed overall operational integrity status of the transit based on the recorded detailed operational integrity status data, transmits the obtained status indication via the RFID interface to the transit for storage in the second memory area of the RFID chip, and makes the recorded detailed operational integrity status data or the obtained status indication available to a maintenance server together with the read transit identity.

32 Claims, 14 Drawing Sheets

(51) Int. Cl.
*G06K 17/00* (2006.01)
*G01M 99/00* (2011.01)
*H02G 3/22* (2006.01)
*F16L 55/02* (2006.01)

(52) U.S. Cl.
CPC .............. *G06Q 50/06* (2013.01); *F16L 55/02* (2013.01); *H02G 3/22* (2013.01)

(56) References Cited

U.S. PATENT DOCUMENTS

| | | | |
|---|---|---|---|
| 2003/0050716 A1* | 3/2003 | Heiland | F16F 15/02 700/63 |
| 2004/0123998 A1 | 7/2004 | Berglund et al. | |
| 2006/0019540 A1 | 1/2006 | Werthman et al. | |
| 2007/0194889 A1 | 8/2007 | Bailey et al. | |
| 2007/0273507 A1* | 11/2007 | Burchell | G01K 3/04 340/539.27 |
| 2008/0240724 A1* | 10/2008 | Aguren | H04B 10/07 398/139 |
| 2009/0089691 A1* | 4/2009 | Gurevich | H02G 3/00 715/764 |
| 2009/0278685 A1 | 11/2009 | Potyrailo et al. | |
| 2012/0266409 A1 | 10/2012 | Andersson et al. | |
| 2013/0150004 A1* | 6/2013 | Rosen | H04W 8/22 455/414.1 |
| 2013/0229262 A1* | 9/2013 | Bellows | H01Q 1/007 340/10.1 |
| 2013/0285795 A1 | 10/2013 | Virtanen et al. | |
| 2015/0171959 A1* | 6/2015 | Kim | H04B 10/073 398/20 |
| 2018/0031396 A1 | 2/2018 | Bohlin et al. | |

FOREIGN PATENT DOCUMENTS

| | | |
|---|---|---|
| JP | 2009-247081 A | 10/2009 |
| JP | 2010-006567 A | 1/2010 |
| JP | 2011-203972 A | 10/2011 |
| WO | WO 2010/089286 A2 | 8/2010 |
| WO | WO 2012/052599 A1 | 4/2012 |
| WO | 2014086591 A1 | 6/2014 |

OTHER PUBLICATIONS

International Search Report and Written Opinion for PCT/SE2016/050157 dated Jun. 29, 2016.
Search Report for European Patent Application No. 16759214.6, dated Oct. 26, 2018.
Chinese Action for corresponding Chinese Application No. 201680025637.3 dated Dec. 24, 2019 (16 pages), English translation.
Office Action issued in corresponding JP Application No. 2017-545734 dated Oct. 29, 2019 (4 pages) including English translation.
European Summons Request for Oral Proceedings in EP Application No. 16759214.6 dated Nov. 3, 2020 (17 pages).
Platzer et al. "On the Suitability of Different Features for Anomaly Detection in Wire Ropes." Communications in Computer and Information Science. vol. 68, pp. 296-308 (2010).

* cited by examiner

INSPECTION SYSTEM FOR CABLE, PIPE OR WIRE TRANSITS

This application is a National Stage Application of PCT/SE2016/050157, filed 1 Mar. 2016, which claims benefit of Swedish Patent Application No. 1550249-5, filed 3 Mar. 2015, which applications are incorporated herein by reference. To the extent appropriate, a claim of priority is made to each of the above disclosed applications.

TECHNICAL FIELD

The present invention generally relates to the field of sealed installations of cables, pipes or wires, and more particularly to inspection of cable, pipe or wire transits, where each transit may comprise a plurality of transit elements having been assembled into a sealed installation of one or more cables, pipes or wires at a site.

BACKGROUND

Sealed installations of cables or pipes are commonly used in many different environments, such as for cabinets, technical shelters, junction boxes and machines. They are used in a variety of different industries, such as automotive, telecom, power generation and distribution, as well as marine and offshore. The sealed installations serve to seal effectively against fluid, gas, fire, rodents, termites, dust, moisture, etc., and may involve cables for electricity, communication, computers, etc., pipes for different gases or liquids such as water, compressed air, hydraulic fluid and cooking gas, and wires for load retention.

The present applicant is a global leader in the development of cable, pipe or wires transits for sealing purposes. A transit, which may also be referred to as a lead-through, is made up of a plurality of different transit elements which upon installation at a site are assembled into a sealed installation of one or more cables, pipes or wires. One commonly used transit type has an essentially rectangular frame, inside of which a number of modules are arranged to receive cables, pipes or wires. The modules are made of an elastic material, such as rubber or plastics, and are thus compressible and moreover adaptable to different outer diameters of the cables, pipes or wires. The modules are typically arranged side by side in one or more rows together with some kind of compression unit. The compression unit is placed between the frame and the modules in such a way that when the compression unit is expanded, the compressible modules will be compressed around the cables, wires or pipes. For ease of description, the term "cable" will be mainly used in this document, but it should be construed broadly and a person skilled in the art will realise that it normally also covers pipes or wires, or is an equivalent thereof.

Another type of transit has an essentially cylindrical form and is to be received in a sleeve, also known as a pipe sleeve, in a wall or an opening in a wall. To function in the desired way, the transit is adapted to fit snugly into the sleeve or the opening of the wall in which it is received, and the transit is adaptable to the actual mounting dimension. The mounting dimension is dictated by the inner diameter of the sleeve or the opening. The transit has a cylindrical compressible body, which is compressed axially between fittings at the opposite ends of the compressible body. By the axial compression the cylindrical body will expand radially both inwards and outwards. Furthermore, the cables received may have different outer diameters, and, thus, the module is adaptable to cables having different outer diameters.

Other types of transits are also known in the technical field, as the skilled person is well aware of per se.

The present inventors have realized that inspection of transits and transit elements in operation at a site is an important activity which is in need of improvements for several reasons which will appear to the reader of the following sections of this document.

Moreover, the present inventors have realized that improvements are also available by integrating inspection aspects with maintenance aspects and development aspects in the field of sealed installations of cables, pipes or wires.

SUMMARY

It is accordingly an object of the invention to provide one or more improvements in inspection of cable, pipe or wire transits, where each transit may comprise a plurality of transit elements having been assembled into a sealed installation of one or more cables, pipes or wires at a site.

One aspect of the present invention is an inspection system for cable, pipe or wire transits, each transit comprising a plurality of transit elements having been assembled into a sealed installation of one or more cables, pipes or wires at a site, the inspection system comprising:

a portable inspection device having a controller and an RFID interface; and a maintenance server, wherein each transit further comprises an RFID chip having a memory, the memory comprising at least a first memory area and a second memory area, the first memory area for storing an identity of the transit, and wherein the controller of the portable inspection device is configured to:

read the identity of one of the transits via the RFID interface;

record detailed operational integrity status data of the transit elements of the transit;

obtain a status indication representing an assessed overall operational integrity status of the transit based on the recorded detailed operational integrity status data of the transit elements of the transit;

transmit the obtained status indication via the RFID interface to the transit, thereby allowing storage of the status indication in the second memory area of the RFID chip in the transit; and make at least either the recorded detailed operational integrity status data or the obtained status indication available to the maintenance server together with the read identity of the transit.

Other aspects and features of the invention and its embodiments are defined by the appended patent claims and are further explained, together with problems solved and advantages obtained, in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings, in which.

DETAILED DESCRIPTION

Figure 1:
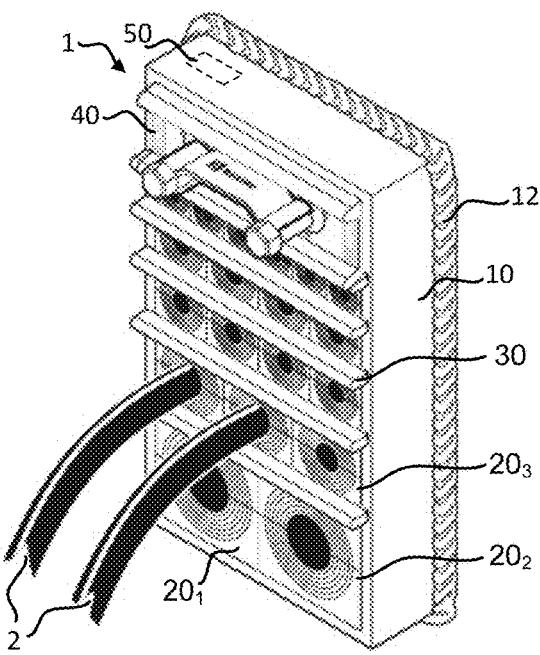
FIG. 1 is a schematic isometric view of a transit comprising a plurality of different transit elements which upon installation at a site have been assembled into a sealed installation of a plurality of cables.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 schematically illustrates a transit 1, also known as a lead-through, comprising a plurality of different transit elements 10, 20, 30, 40, 50 which upon installation at a site have been assembled into a sealed installation of a plurality of cables 2. Generally, the transit elements which make up a transit may be of different types and may exist as a single instance or as multiple instances, depending on implementation. Generally, the implementation has typically been designed, prior to installation, by a transit designer using a transit development server 400 and an associated database 402 (see for instance FIG. 6 which will be described in more detail later).

As seen in FIG. 1, the transit 1 comprises a frame 10, inside of which a plurality of compressible modules are arranged in different sizes and numbers (only three of the compressible modules being indicated as $20_1$, $20_2$ and $20_3$ in FIG. 1). The frame 10 of the transit 1 is mounted by means of a packing, sealing or weld joint 12.

Figure 2A:
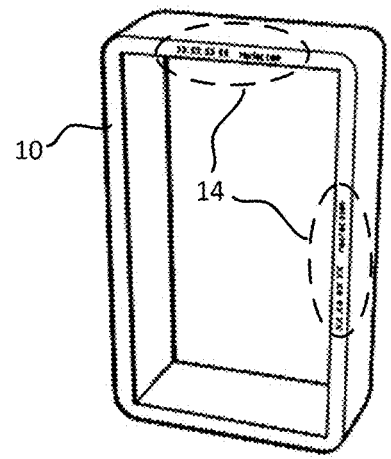
FIG. 2a is a schematic isometric view of a first type of transit element in the form of an essentially rectangular frame.
Figure 2B:
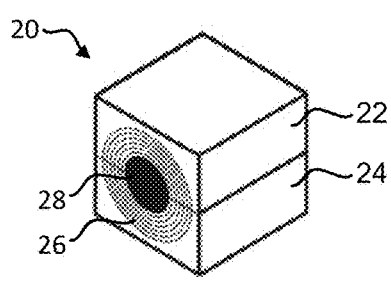
FIG. 2b is a schematic isometric view of a second type of transit element in the form of a compressible module.

A compressible module 20 is shown in FIG. 2b. The compressible module 20 has a box-shaped body which is divided into two halves 22, 24. A number of layers 26 of elastic material are concentrically arranged in the body 22, 24 around a center core 28. By removing the core 28 and peeling off a suitable number of layers 26 at installation, the compressible module 20 may be adapted to securely engage a cable 2 among cables of different diameters. In the example seen in FIG. 1, only two cables 2 are mounted in two respective modules 20; the remainder of the modules 20 in FIG. 1 are currently not used for cable lead-through and therefore still have the respective cores 28 in place.

As is clear from FIG. 1, a (main) transit element type (such as a compressible module 20) may in turn appear in different (sub) types, for instance differentiated by size (see modules $20_2$ and $20_3$ in FIG. 1).

Figure 2C:
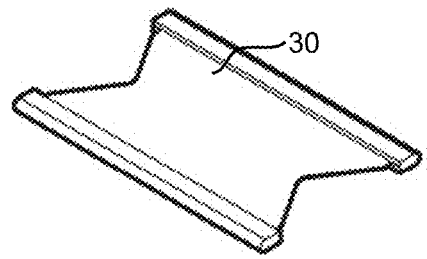
FIG. 2c is a schematic isometric view of a third type of transit element in the form of a stayplate.

FIG. 2c illustrates a third type of transit element in the form of a stayplate 30 which, as is seen in FIG. 1, is used to separate different rows of compressible modules 20 in the frame 10.

Figure 2D:
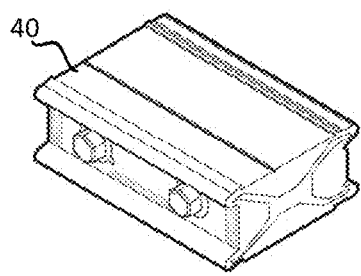
FIG. 2d is a schematic isometric view of a fourth type of transit element in the form of a wedge or compression unit.
Figure 2E:
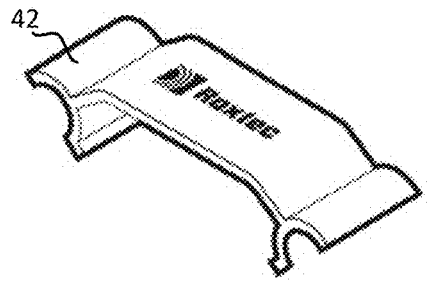
FIG. 2e is a schematic isometric view of a fifth type of transit element in the form of a wedge clip.

FIG. 2d illustrates a fourth type of transit element in the form of a wedge or compression unit 40. A fifth type of transit element in the form of a wedge clip 42 is seen in FIG. 2e. The compression unit 40 is placed between the frame 10 and the modules 20 in such a way that when the compression unit is expanded, the compressible modules will be compressed around the cables 2. The wedge clip 42 serves to prevent accidental loosening (de-expansion) of the compression unit 40.

Figure 3:
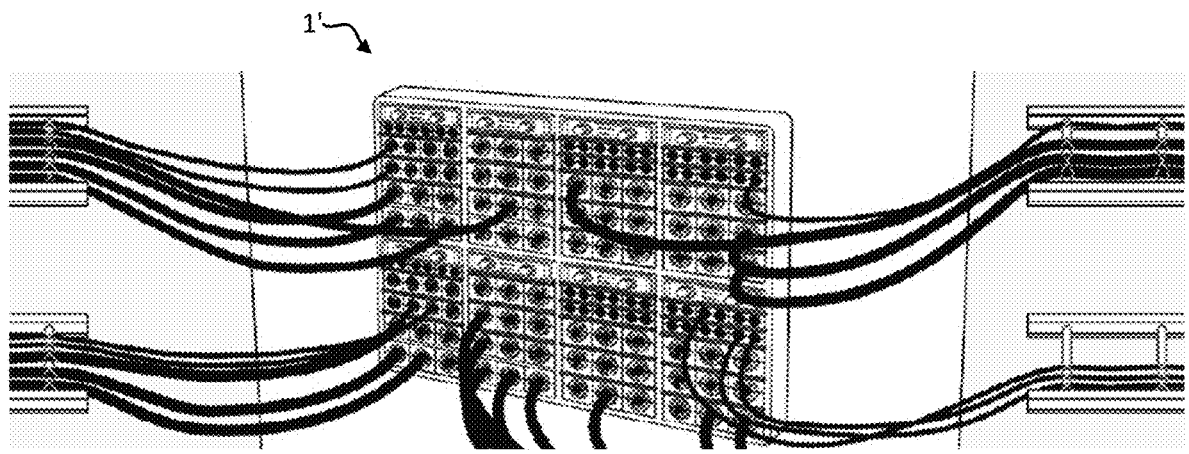
FIG. 3 is a schematic isometric view of a more complex transit.

It is to be noticed that different transits may vary considerably in size and complexity, depending on the nature and implementation requirements at the installation site in question. FIG. 3 shows an example of a more complex transit 1'.

As indicated above in the background section of this document, there is a general need for inspection of the (long-term) operational integrity of transits. To this end, and pursuant to the present invention, an inspection system for cable, pipe or wire transits is provided in various embodiments which will now be described with reference to FIGS. 4-17.

Figure 4:
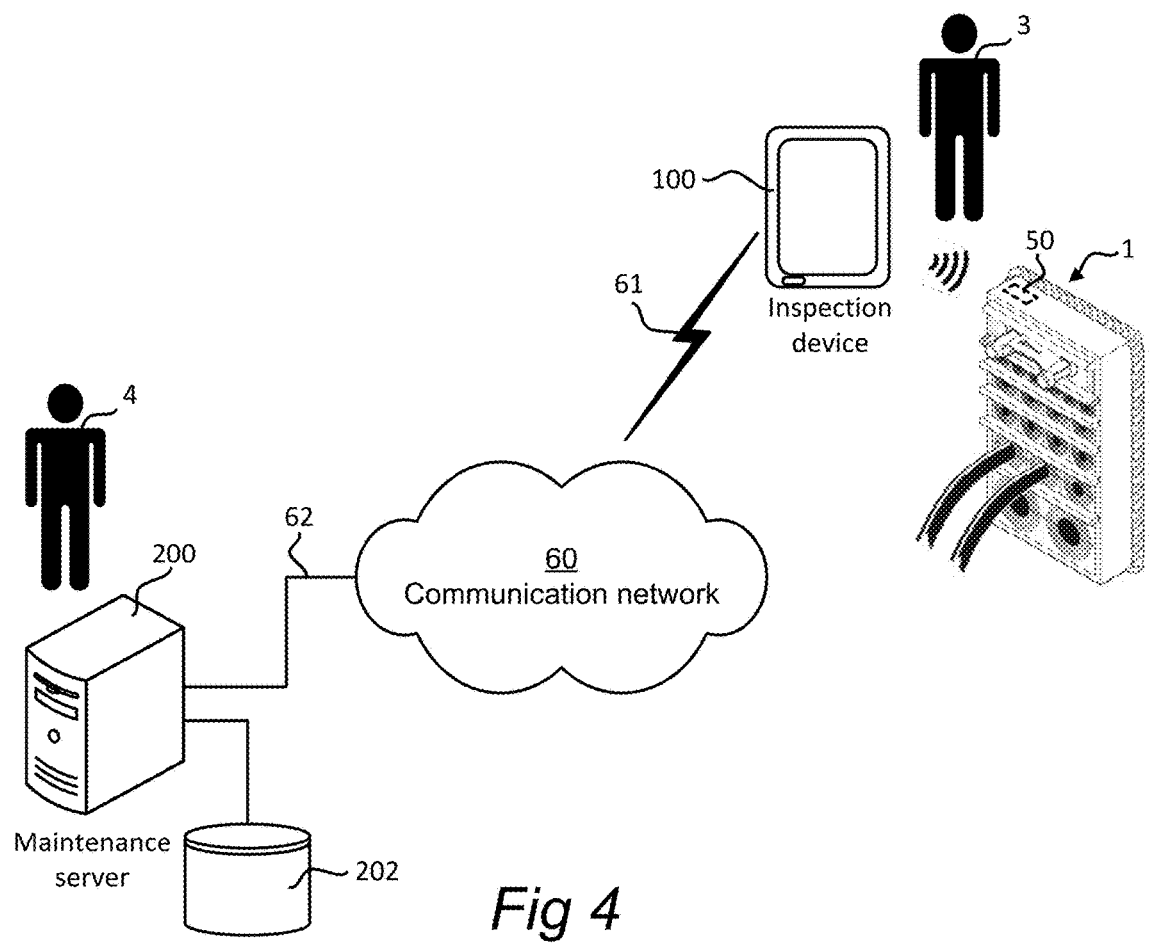
FIG. 4 is a schematic illustration of an inspection system for cable, pipe or wire transits according to one embodiment.

Starting with FIG. 4, the inspection system in this embodiment comprises a portable inspection device 100 and a maintenance server 200 having an associated database 202. The portable inspection device 100 and the maintenance server 200 are operably connected by a communication network 60, which may be a mobile telecommunication network (compliant with any commercially available mobile telecommunication standard, for instance (without limitation) GSM, UMTS, LTE, D-AMPS, CDMA2000, FOMA and TD-SCDMA), a wide area data network (such as an IP based data network in the form of the Internet or a part thereof), a local area network (such as a WiFi/WLAN, Bluetooth or LAN network), or any combination thereof. The portable inspection device 100 may conveniently connect to the communication network 60 via a wireless link 61, and the maintenance server 200 may connect to the communication network 60 via a suitable connection or access point 62.

An inspector 3 will use the portable inspection device 100 as a tool when making an inspection of a certain transit 1 at a certain site, possibly among various transits at various sites. To this end, each transit is provided with an RFID chip 50 as is seen generally in FIGS. 1 and 4. The RFID chip 50 may be provided in the frame 10 or in any of the other transit elements, such as the compression unit 40 or one of the compressible modules 20. In an alternative embodiment, the RFID chip 50 may be attached to the transit 1 by a suitable adhesive, fastening means, strap, etc.

During the inspection of the transit 1, the inspector 3 will use the portable inspection device 100 to interact with the RFID chip 50 in the transit 1 as well as with the maintenance server 200, so as to make the results of the inspection readily available to, for instance, maintenance personnel 4. The operational flow of the inspection procedure in different embodiments will be described in more detail later with reference to FIGS. 9-17.

Figure 5:
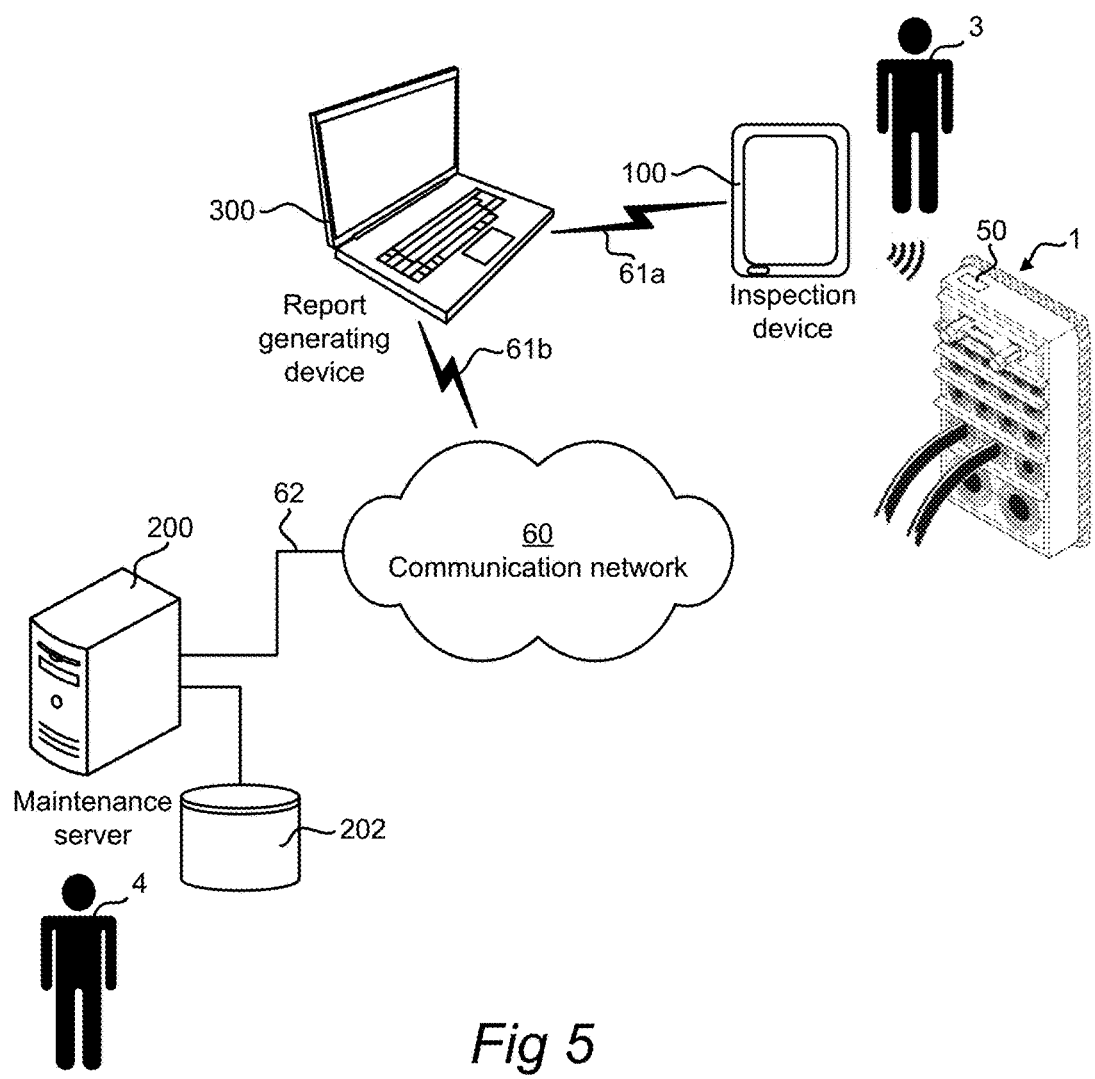
FIG. 5 is a schematic illustration of an inspection system for cable, pipe or wire transits according to another embodiment.

In an embodiment which is illustrated in FIG. 5, the inspection system further comprises a report generating device 300. The report generating device 300 may, for instance, be implemented by a portable or stationary computer and will serve as a docking station to the portable inspection device 100. In this embodiment, the portable inspection device 100 communicates with the maintenance server 200 indirectly through the report generating device 300 and the communication network 60 via links 61a and 61b.

Figure 6:
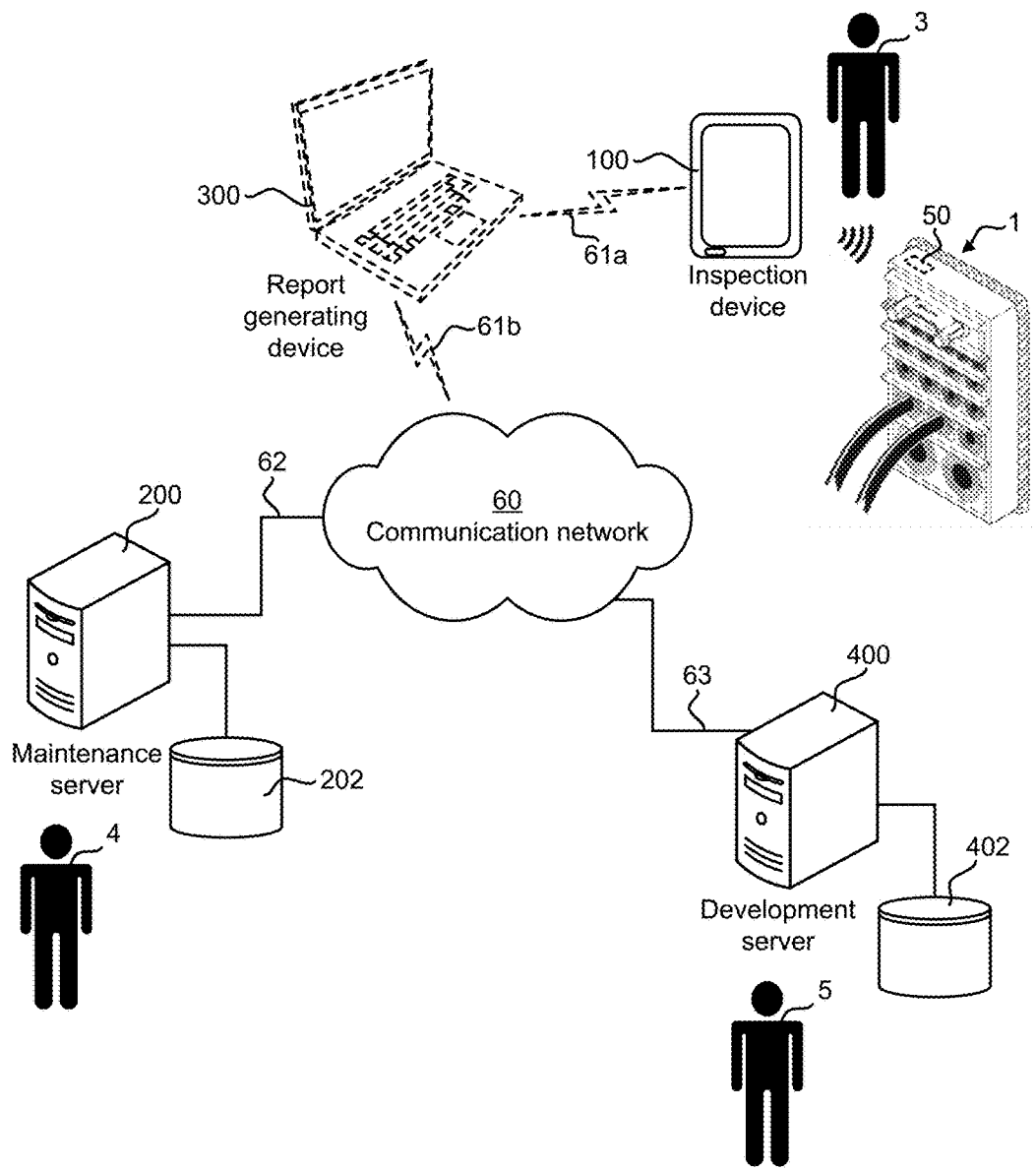
FIG. 6 is a schematic illustration of an inspection system for cable, pipe or wire transits according to yet another embodiment.

In an embodiment which is illustrated in FIG. 6, the inspection system further comprises a transit development server 400 which may connect to the communication network 60 as seen at 63. The transit development server 400 comprises, or is otherwise associated with, a transit development database 402, which may contain definitions of transit types and transit element types available for inclusion in the design of a particular transit.

Hence, a developer 5 may use the transit development server 400 and the transit development database 402 to design a transit for use at a particular site, by exploring, selecting and configuring among the definitions of transit types and transit element types, and integrating them into a transit layout.

Additionally or alternatively, the developer 5 may use the transit development server 400 and the transit development database 402 to develop new transit types or transit element types, and/or to redesign existing transit types or transit element types.

The embodiment of FIG. 6 may or may not include the report generating device 300 from FIG. 5.

The RFID chip 50 and the portable inspection device 100 will now be described in more detail with reference to FIGS. 7a-d and 8.

Figure 7A:
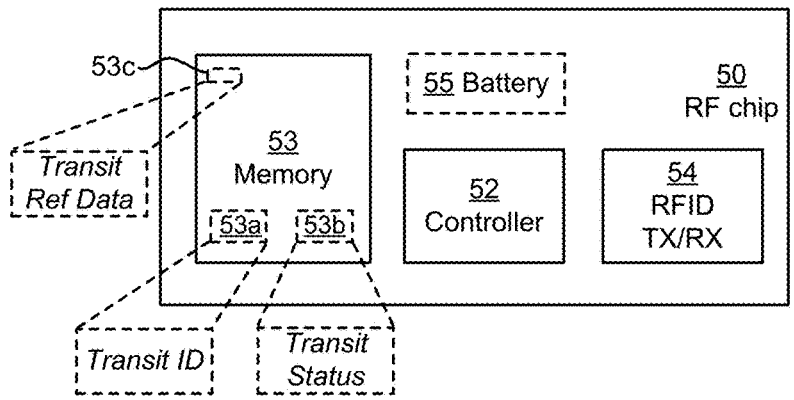
FIG. 7a is a schematic block diagram of an RFID chip for a transit according to one embodiment.

As seen in FIG. 7a, in a basic embodiment, the RFID chip 50 comprises a controller 52, a memory 53 and a RFID transceiver 54. The RFID chip 50 may generally be based on any existing passive, semi-passive or active RFID technology, employing electromagnetic communication in any available or permissible frequency spectrum. In the former case, the components of the RFID chip 50 are powered by energy induced by an incident interrogation signal from an RFID reader in the portable inspection device 100 (see RFID interface 104 in FIG. 8). In the latter two cases, the components of the RFID chip 50 are powered by a battery 55 or similar internal power source in the RFID chip 50.

Figure 8:
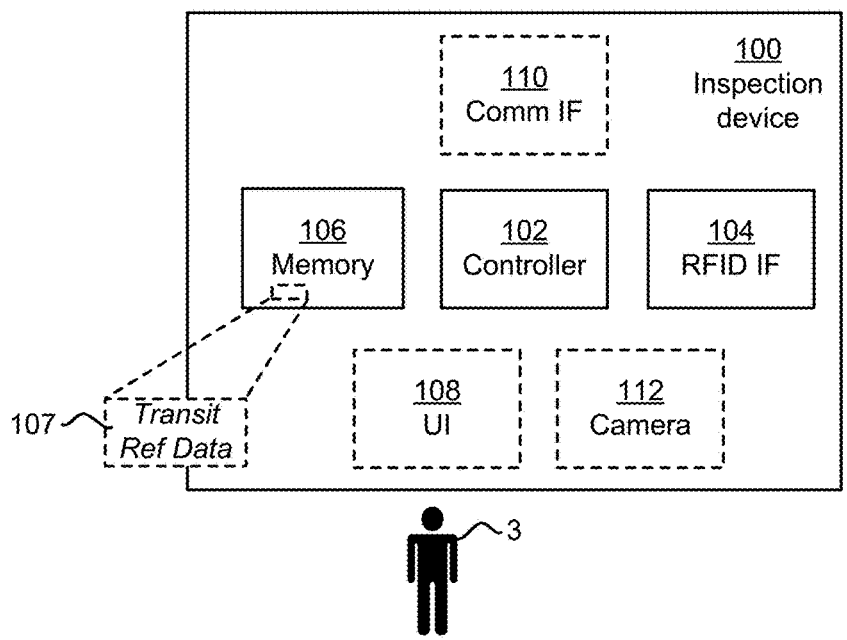
FIG. 8 is a schematic block diagram of a portable inspection device being part of the inspection system for cable, pipe or wire transits according to FIG. 4, FIG. 5 or FIG. 6.

As seen in FIG. 8, in a basic embodiment, the portable inspection device 100 comprises a controller 102, the RFID interface 104 and a memory 106. Optionally, but preferred, the portable inspection device 100 also comprises a user interface 108 towards the inspector 3.

Optionally, but preferred, the portable inspection device 100 moreover comprises a network communication interface 110 to establish the link 61 to the communication network 60 (in embodiments without a network communication interface 110, the RFID interface 104 may be employed both for the RFID communication with the RFID chip 50 and for the link 61 to the communication network 60). Optionally, the portable inspection device 100 may also comprise a camera 112.

In some embodiments, the portable inspection device 100 may be implemented as a tablet computer (also known as surfpad), a personal digital assistant or as a smartphone or other mobile terminal, wherein the user interface 108 comprises a touch-sensitive display screen.

Figure 9:
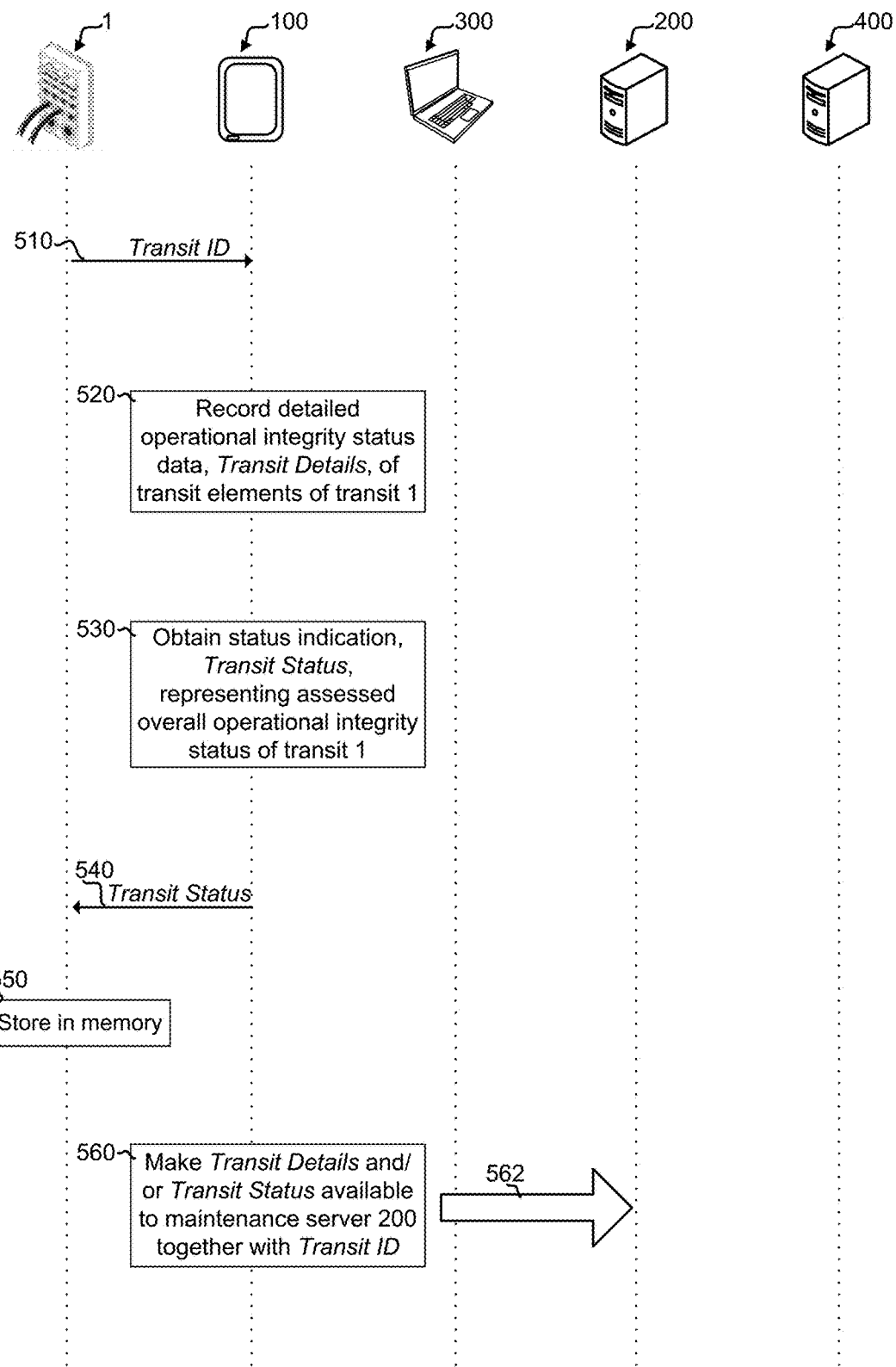
FIG. 9 is a schematic flowchart diagram for an inspection system for cable, pipe or wire transits according to one embodiment.

The operational flow of the inspection procedure in a basic embodiment of the inspection system is illustrated in FIG. 9. As seen at 510 in FIG. 9, at the beginning of the inspection procedure, the controller 102 of the portable inspection device 100 interrogates the RFID chip 50 to read an identity, Transit ID, of the transit 1 via the RFID interface 104 of the portable inspection device 100 and the RFID transceiver 54 of the RFID chip 50. The identity Transit ID has been stored in advance in a first memory area 53a of the memory 53 in the RFID chip 50, for instance upon manufacture of the RFID chip 50, upon integration of the RFID chip 50 into a particular transit element (such as the frame 10, the compression unit 40 or one of the compressible modules 20 of the transit 1 shown in FIG. 1), or upon assembly and installation of the transit 1 at the site in question. The identity Transit ID may represent a serial number or similar information which is also printed on the frame 10, as seen at 14 in FIG. 2a, or it may represent a different kind of identity.

The controller 102 of the portable inspection device 100 then records detailed operational integrity status data, Transit Details, of the transit elements 10, 20, 30, 40, 50 of the transit 1, as seen at 520 in FIG. 9. Further details of this step will be given later.

Then, as seen at 530 in FIG. 9, the controller 102 of the portable inspection device 100 obtains a status indication, Transit Status, which represents an assessed overall operational integrity status of the transit 1 based on the recorded detailed operational integrity status data Transit Details of the transit elements 10, 20, 30, 40, 50 of the transit 1. The status indication Transit Status may advantageously be assigned a value among a predetermined set of possible values, such as {Passed, Failed}, or {Passed, Passed With Remark (remedy not urgent), Failed (remedy urgent)}. Further details of this step will be given later.

The obtained status indication Transit Status is then transmitted by the controller 102 of the portable inspection device 100 via the RFID interface 104 to the transit 1. The RFID transceiver 54 of the RFID chip 50 will receive the obtained status indication Transit Status, thereby allowing the controller 52 of the RFID chip 50 to store the status indication Transit Status in a second memory area 53b of the memory 53 of the RFID chip 50 in the transit 1, as is seen at 550 in FIG. 9.

Storing the indication Transit Status in the RFID chip 50 is advantageous, since it will allow subsequent quick checks of the assessed overall operational integrity status of the transit 1 for site managers, authority officials, maintenance personnel, etc, by simply reading the stored indication Transit Status with a suitable RFID reader.

In some embodiments, a date and/or time value representing the current date and/or time is stored together with the indication Transit Status in the memory 53 of the RFID chip 50. Such a date and/or time value may be provided by the portable inspection device 100, or by the RFID chip 50 itself, if provided with a real-time clock (for instance as seen at 58 for the embodiment shown in FIG. 7d). The date and/or time value may be read subsequently by the aforementioned site manager, authority official, maintenance personnel, etc, together with the stored indication Transit Status and thus allow a judgment of the "freshness" (and therefore relevance) of the stored indication Transit Status of the transit 1.

Finally, in a concluding step 560 in FIG. 9, the controller 102 of the portable inspection device 100 makes at least either the recorded detailed operational integrity status data Transit Details or the obtained status indication Transit Status available to the maintenance server 200 together with the read identity Transit ID of the transit 1, as is schematically indicated at 562 in FIG. 9. Further details of these steps 560, 562 according to different embodiments will be given later.

Figure 10:
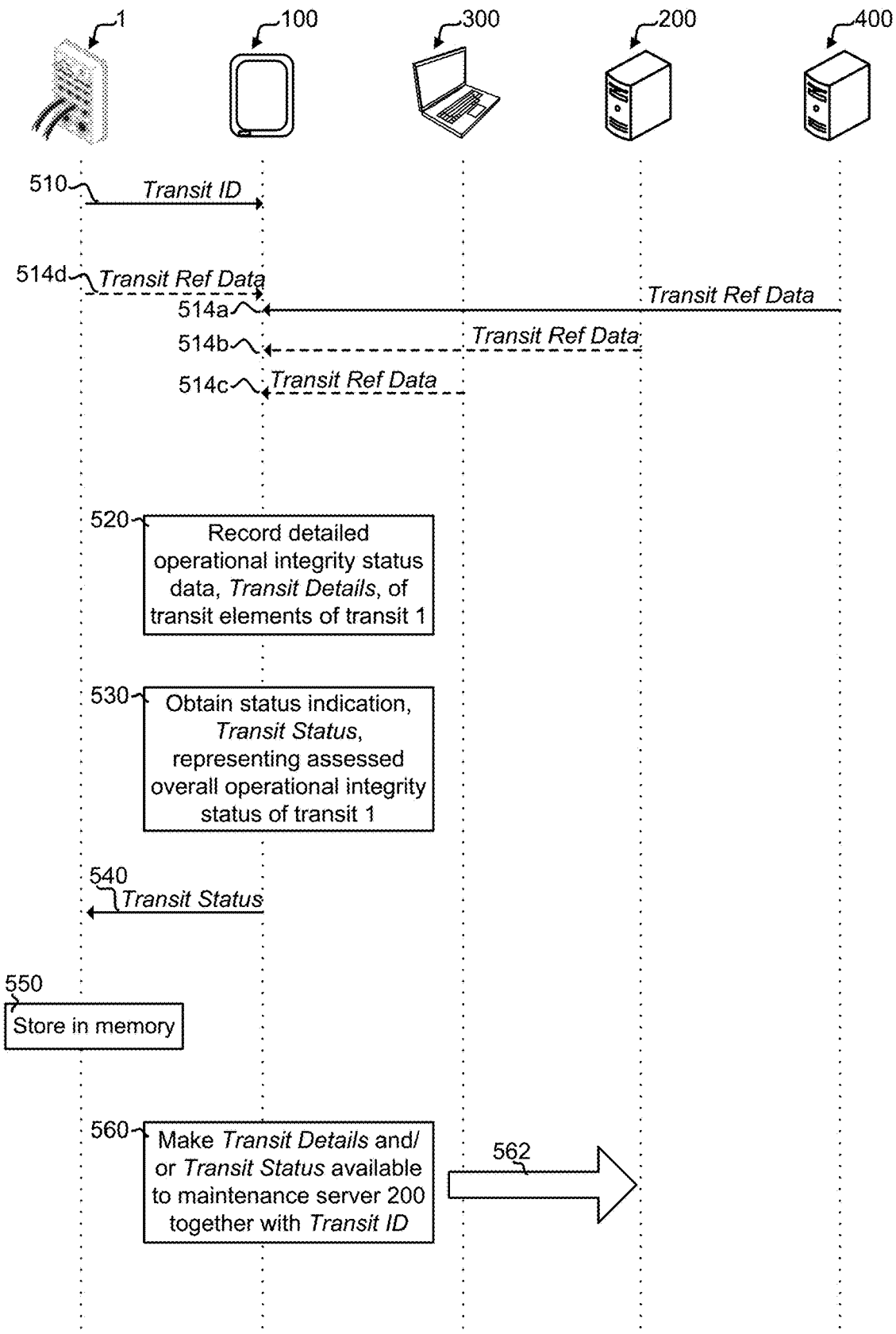
FIG. 10 is a schematic flowchart diagram for an inspection system for cable, pipe or wire transits according to another embodiment.

In one embodiment, as is illustrated at 514a/514b/514c/514d in FIG. 10, the controller 102 of the portable inspection device 100 is configured to retrieve transit reference data, Transit Ref Data, which defines each transit element 10, 20, 30, 40, 50 and its relative position in the transit 1, and use the retrieved transit reference data Transit Ref Data when recording, in step 520, the detailed operational integrity status data Transit Details of the transit elements 10, 20, 30, 40, 50 of the transit 1.

Advantageously, as seen at 514a in FIG. 10, the controller 102 of the portable inspection device 100 retrieves the transit reference data Transit Ref Data from a remote server in the form of the transit development server 400.

Alternatively, as seen at 514b in FIG. 10, the controller 102 of the portable inspection device 100 may retrieve the transit reference data Transit Ref Data from a remote server in the form of the maintenance server 200 (possibly in turn having received the transit reference data from the transit development server 400 at some point in time).

As a further alternative, as seen at 514c in FIG. 10, the controller 102 of the portable inspection device 100 may retrieve the transit reference data Transit Ref Data from the report generating device 300 (possibly in turn having received the transit reference data from the maintenance server 200 or the transit development server 400 at some point in time).

As a another alternative, as seen at 514d in FIG. 10, the controller 102 of the portable inspection device 100 may retrieve the transit reference data Transit Ref Data from the RFID chip 50 via the RFID interface 104. In this alternative, the transit reference data Transit Ref Data have been stored in a memory area 53c in the memory 53 of the RFID chip 50 at some point in time, for instance in the corresponding way as the advance storing of the identity Transit ID; see the description above with regard to step 510 in FIG. 9.

The transit reference data Transit Ref Data will serve as template and reference information on each type of transit element 10, 20, 30, 40, 50, by means of which the controller 102 of the portable inspection device 100 will be able to determine or estimate an operational integrity status for each transit element in the transit 1 when recording the detailed operational integrity status data Transit Details in step 520 of FIG. 10.

Figure 11:
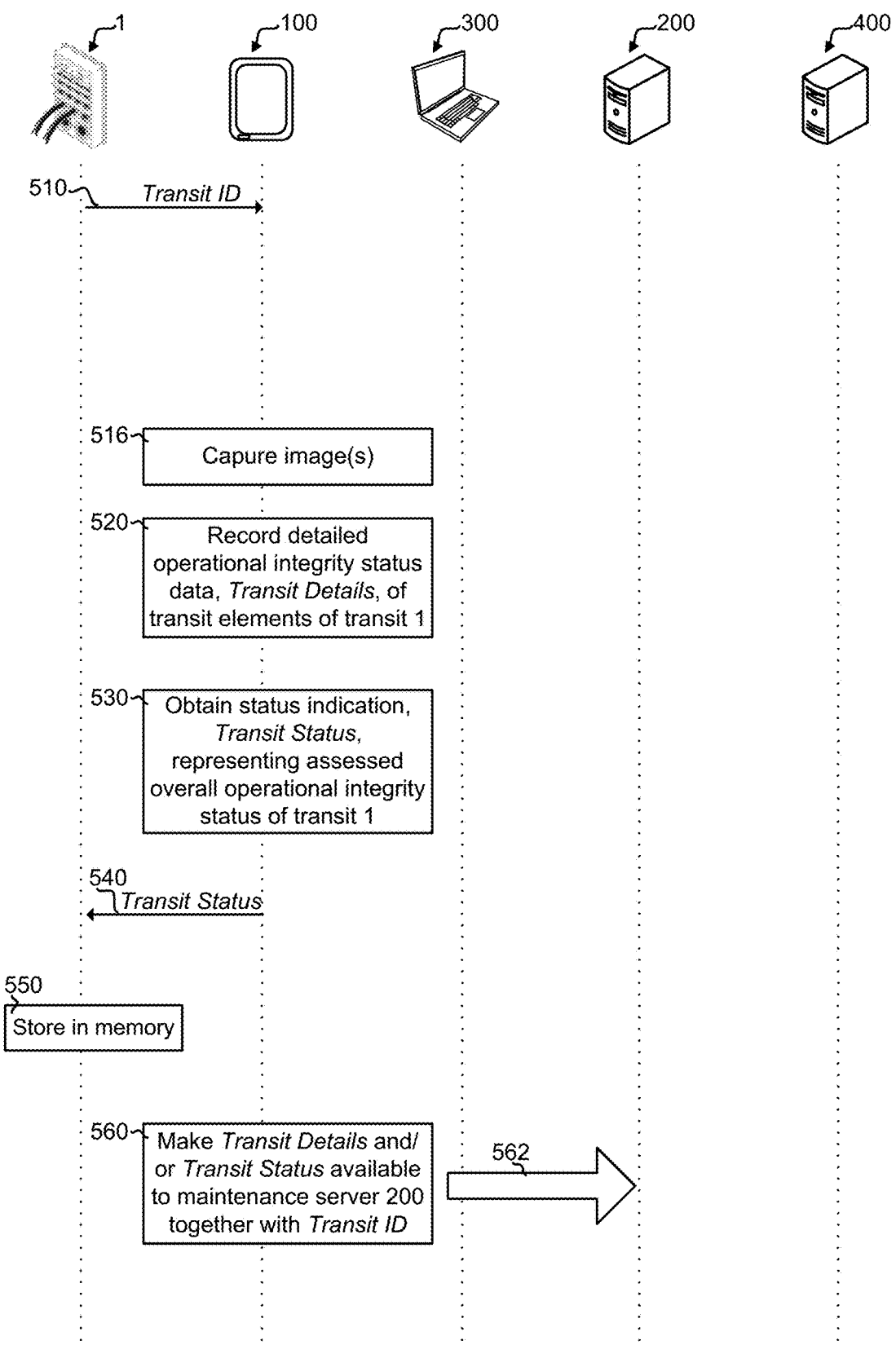
FIG. 11 is a schematic flowchart diagram for an inspection system for cable, pipe or wire transits according to yet another embodiment.

In one embodiment, as is illustrated at 516 in FIG. 11, the controller 102 of the portable inspection device 100 is configured to capture one or more images of the transit 1 with the aforementioned camera 112, and use the captured images when recording, in step 520, the detailed operational integrity status data Transit Details of the transit elements 10, 20, 30, 40, 50 of the transit 1. Additionally or alternatively, the captured images may be used when obtaining, in step 530, the status indication Transit Status for the transit 1.

There may be at least two different possible usages of such images.

A first usage is to illustrate a portion of the transit 1 in more detail, typically a portion for which there has been detected an anomaly, fault, malfunction or other deviation from normal status, and to include this piece of image information with the information which is made available to the maintenance server 200 in steps 560, 562. The portion of interest may typically be an individual transit element or a region in which two or more transit elements are interfacing each other; however, one or more images which capture the entire transit 1 may also be of interest to serve as an overview.

A second usage is to serve as a basis for the actual determination of the detailed operational integrity status data Transit Details of the transit elements 10, 20, 30, 40, 50 of the transit 1 in step 520, and/or for the actual obtaining of the status indication Transit Status for the transit 1 in step 530. This will be explained in more detail later with particular reference to FIG. 14.

Figure 12:
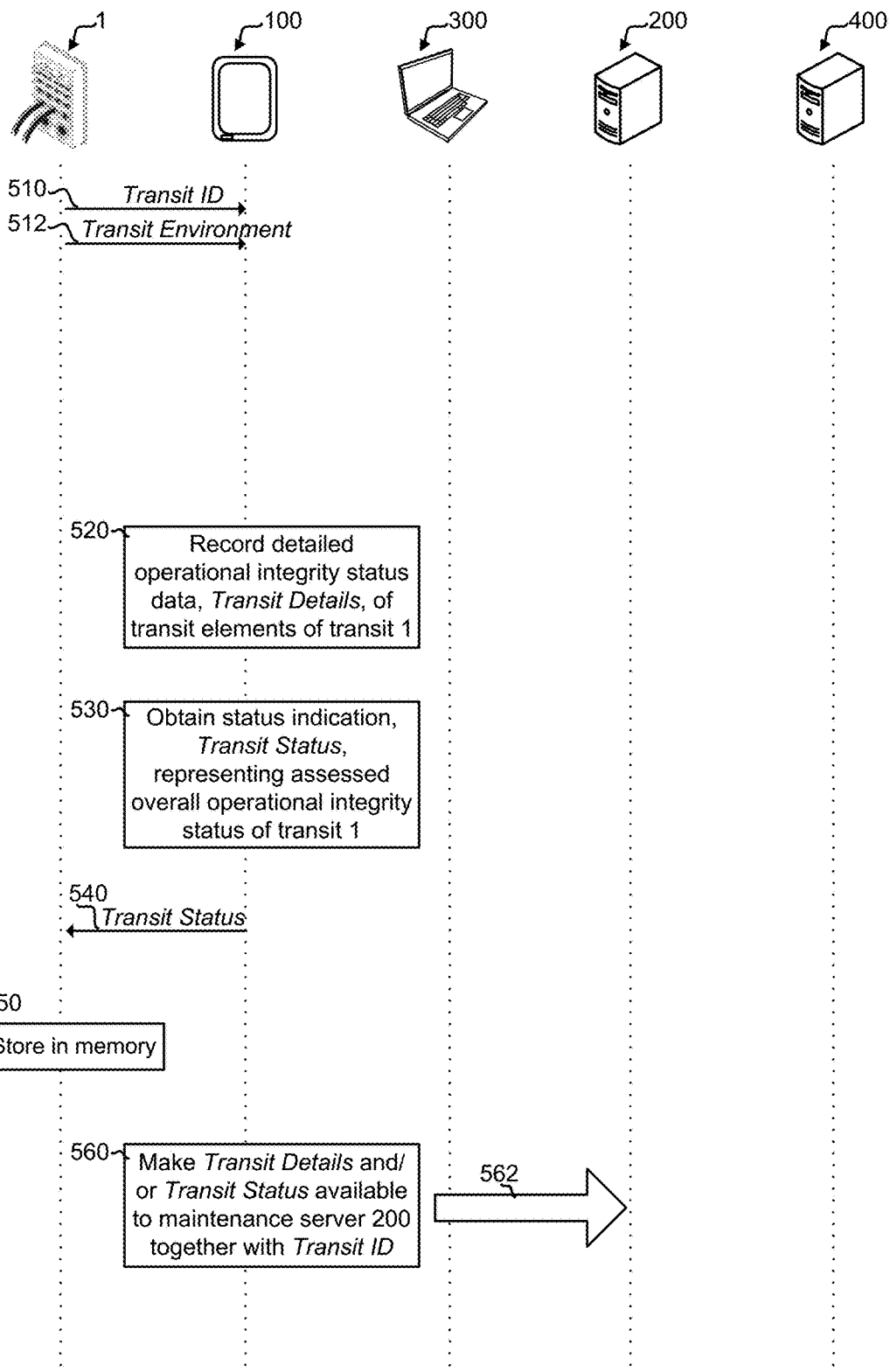
FIG. 12 is a schematic flowchart diagram for an inspection system for cable, pipe or wire transits according to still another embodiment.

In one embodiment, as is illustrated at 512 in FIG. 12, the controller 102 of the portable inspection device 100 is configured to retrieve environmental status data, Transit Environment, from the transit 1 via the RFID interface 104, and use the retrieved environmental status data Transit Environment when recording, in step 520, the detailed operational integrity status data Transit Details of the transit elements 10, 20, 30, 40, 50 of the transit 1. Additionally or alternatively, the retrieved environmental status data Transit Environment may be used when obtaining, in step 530, the status indication Transit Status for the transit 1. The environmental status data Transit Environment is generated by the RFID chip 50, as will now be explained with reference to FIGS. 7b-7d.

Figure 7B:
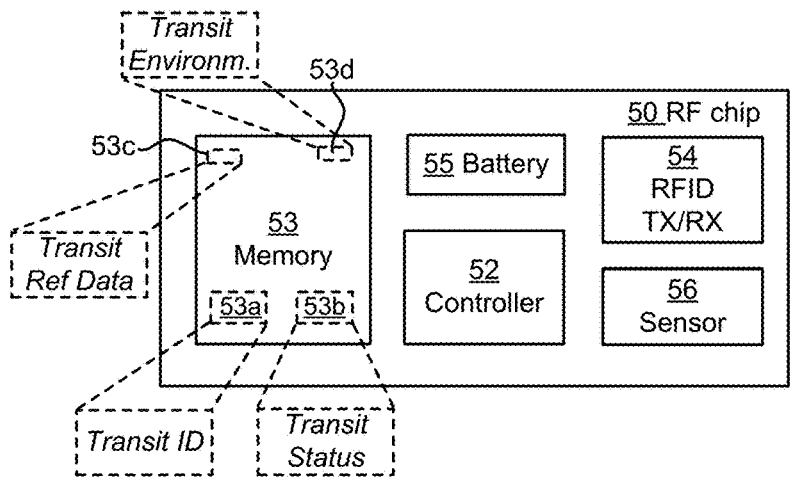
FIG. 7b is a schematic block diagram of an RFID chip for a transit according to another embodiment.
Figure 7C:
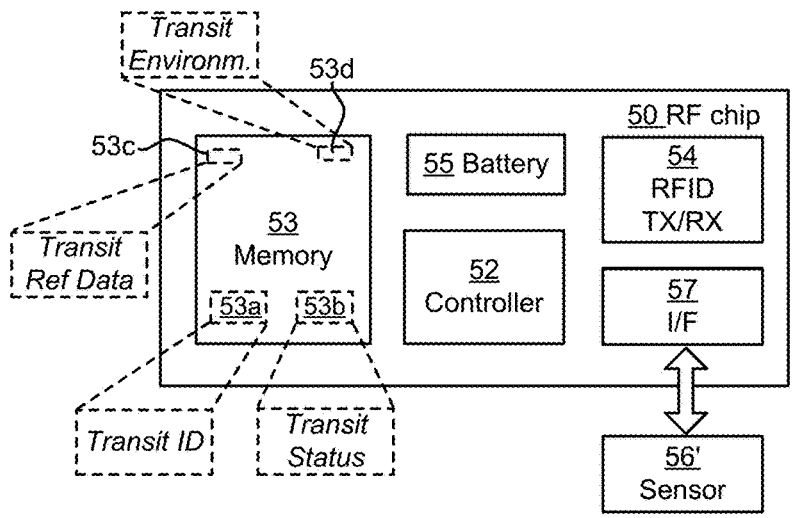
FIG. 7c is a schematic block diagram of an RFID chip for a transit according to yet another embodiment.

To this end, the RFID chip 50 of this embodiment has a sensor 56, 56' adapted to provide the environmental status data Transit Environment for the transit 1, or preferably one or more of the following environmental parameters: pressure, temperature, smoke, moisture, and gas. As is seen in FIG. 7b, the sensor 56 may be provided on the actual RFID chip 50. Alternatively, as is seen in FIG. 7c, the sensor 56' may be provided outside of the RFID chip 50 at another location in or near the transit 1; in this case the sensor 56' will be connected to the RFID chip 50 via a wired or wireless interface 57.

The controller 52 of the RFID chip 50 is configured to receive measurement data from the sensor 56/56', and store it as the environmental status data Transit Environment in a third memory area 53d of the memory 53 of the RFID chip 50. When the controller 102 of the portable inspection device 100 requests retrieval of environmental status data, the controller 52 of the RFID chip 50 will read the stored environmental status data Transit Environment from the third memory area 53d of the memory 53 of the RFID chip 50, and transmit it to the portable inspection device 100 via the RFID transceiver 54, as is seen at 512 in FIG. 12.

Figure 7D:
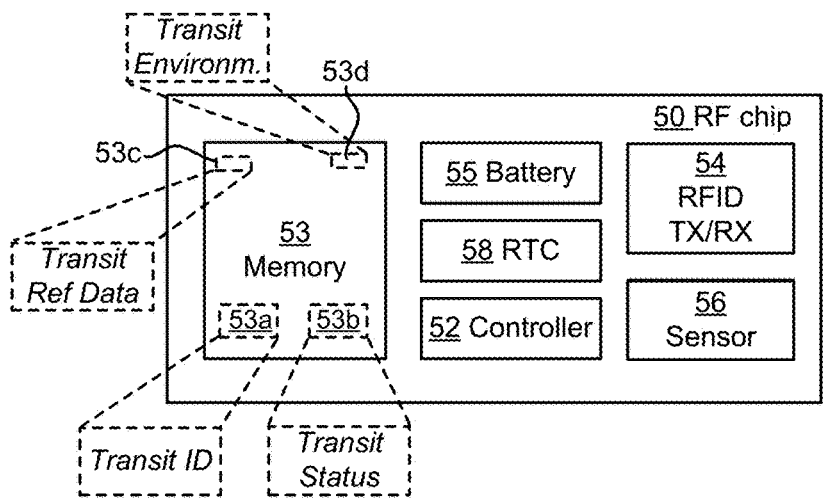
FIG. 7d is a schematic block diagram of an RFID chip for a transit according to still another embodiment.

In one embodiment, the controller 52 of the RFID chip 50 receives the measurement data from the sensor 56/56' on a regular basis, such as every hour, day, week, etc, and appends the received measurement data to the existing environmental status data Transit Environment in the third memory area 53d of the memory 53 of the RFID chip 50. This may serve as a log file to allow long-term analysis of the environment to which the transit 1 and its transit elements 10, 20, 30, 40, 50 are exposed, in step 520 or 530 of FIG. 12. In this embodiment, the RFID chip 50 advantageously comprises a real-time clock 58, as is seen in FIG. 7d, and the controller 52 of the RFID chip 50 is advantageously configured to store the received measurement data together with temporal data from the real-time clock 58 comprised in the environmental status data Transit Environment in the third memory area 53d of the memory 53 of the RFID chip 50.

Alternatively, for memory preservation reasons, only the n latest readings of measurement data from the sensor 56/56' may be stored in the third memory area 53d, where n is a suitable integer value.

In another embodiment, the controller 52 of the RFID chip 50 receives measurement data irregularly and only when the sensor 56/56' detects measurement data which in some way deviates from normal values—such as a temperature or pressure exceeding a normal operation temperature or pressure by a threshold margin, or a detection of gas which should not normally exist at the site in question.

In one embodiment, the controller 52 of the RFID chip 50 is configured to (pre)process the measurement data received from the sensor 56/56', and categorize the measurement data into one of a plurality of different categories, such as for instance {Normal, Alert} or {Normal, Abnormal, Indecisive}. The controller 52 of the RFID chip 50 will store the result of the (pre)processing comprised in the environmental status data Transit Environment in the third memory area 53d of the memory 53 of the RFID chip 50. Including such a categorization in the environmental status data Transit Environment will facilitate for the controller 102 of the portable inspection device 100 when recording the detailed operational integrity status data Transit Details of the transit elements 10, 20, 30, 40, 50 of the transit 1 in step 520, and/or when obtaining the status indication Transit Status for the transit 1 in step 530.

Figure 13:
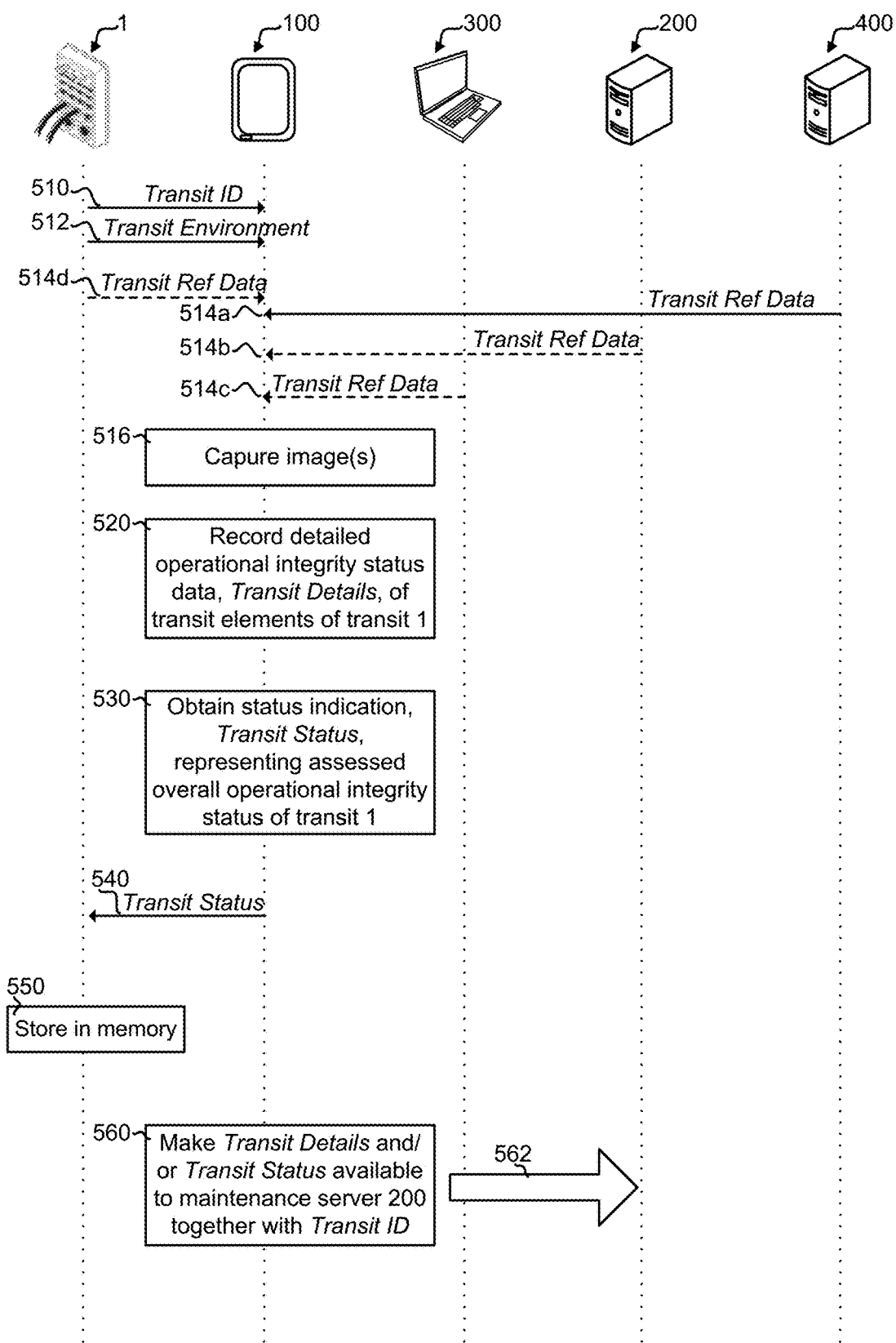
FIG. 13 is a schematic flowchart diagram for an inspection system for cable, pipe or wire transits according to a further embodiment.

As is seen in FIG. 13, the embodiments of FIGS. 10, 11 and 12 may be combined to further facilitate for the controller 102 of the portable inspection device 100 when recording the detailed operational integrity status data Transit Details of the transit elements 10, 20, 30, 40, 50 of the transit 1 in step 520, and/or when obtaining the status indication Transit Status for the transit 1 in step 530. In the combined embodiment of FIG. 13, the controller 102 of the portable inspection device 100 therefore has access to the transit reference data Transit Ref Data as described above for FIG. 10, the captured images as described above for FIG. 11, as well as the environmental status data Transit Environment as described above for FIG. 12.

Figure 14:
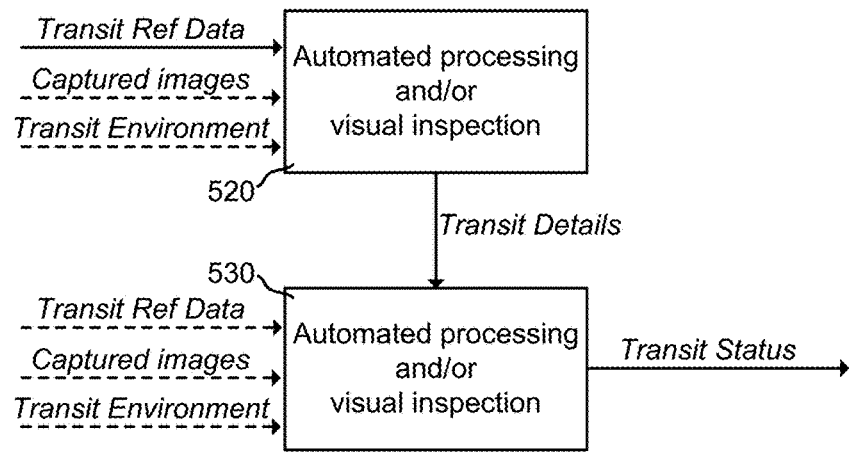
FIG. 14 is a summarizing illustration of the generation of detailed operational integrity status data for transit elements of a transit, and the generation of a status indication representing an assessed overall operational integrity status of the transit, in an inspection system for cable, pipe or wire transits according to different embodiments.

Reference is now made to FIG. 14 which summarizes the generation of the detailed operational integrity status data Transit Details for the transit elements 10, 20, 30, 40, 50 of the transit 1 (cf step 520 in FIGS. 9-13), and the generation of the status indication Transit Status representing an assessed overall operational integrity status of the transit 1 (cf step 530 in FIGS. 9-13), according to different embodiments.

In one of these embodiments, the controller 102 of the portable inspection device 100 is configured to cause automated processing of the retrieved transit reference data Transit Ref Data by way of artificial intelligence, neural network, expert system or similar automated functionality. At least one of, preferably both of, the captured images of the transit 1 and the retrieved environmental status data Transit Environment of the transit 1 are also subjected to the automated processing together with the transit reference data Transit Ref Data. The automated processing may be performed by the controller 102, or by an external device upon request from the controller 102 via the communication network 60.

The automated processing will analyze the captured images of the transit 1 and (or) the retrieved environmental status data Transit Environment of the transit 1 against the transit reference data Transit Ref Data to identify any anomaly, fault, malfunction or other deviation from normal status. Some examples of such anomalies, faults, malfunctions or other deviations are listed below:

Missing or suspiciously manipulated serial number 14 on the frame 10 (FIG. 2a),

Mechanical damage to any of the transit elements 10, 20, 30, 40, 50,

Mechanical damage to the packing, sealing or weld joint 12 of the frame 10,

Incorrect utilization of the entire available packing space within the frame 10, More than one cable 2 in any of the compressible modules 20, Missing center core 28 in any of the compressible modules 20 not having any cable 2, Incorrect number of peeling layers 26 removed from any of the compressible modules 20 having a cable 2, Missing stayplate 30 between rows of compressible modules 20, Misaligned compressible module 20 reaching outside of the edge of a stayplate 30, Improperly installed stayplate 30 between compressible modules 20 and the frame 10,
Improperly installed stayplate 30 between the compression unit 40 and the frame 10,
Incorrect orientation of the compression unit 40,
Incorrect tightening of the compression unit 40,
Missing wedge clip 42,
Excessive or insufficient lubricant between compressible modules 20 and the frame 10,
Excessive or insufficient lubricant between compressible modules 20.

The result of the automated processing will be recorded by the controller 102 to generate the detailed operational integrity status data Transit Details.

In another one of the embodiments summarized in FIG. 14, the controller 102 of the portable inspection device 100 is configured to record the detailed operational integrity status data Transit Details of the transit elements 10, 20, 30, 40, 50 of the transit 1 by receiving an input, for a respective one the transit elements, via the user interface 108 from the inspector 3. Each such input will represent an assessment of the current operational integrity status of the transit element in question, made by the inspector 3 as a result of an ocular inspection of the transit element in comparison with the transit reference data Transit Ref Data and, optionally, the captured images of the transit 1 and/or the retrieved environmental status data Transit Environment.

Hence, in this embodiment, the inspector 3 will analyze his ocular observations of the transit 1 and its transit elements 10, 20, 30, 40, 50 (and, optionally, the captured images of the transit 1 and/or the retrieved environmental status data Transit Environment) against the transit reference data Transit Ref Data to identify any anomaly, fault, malfunction or other deviation from normal status. Examples of such anomalies, faults, malfunctions or other deviations from normal status have been listed above for the automated processing embodiment.

A hybrid embodiment is also conceivable, where the controller 102 uses a combination of automated processing and input from the inspector 3 to record the detailed operational integrity status data Transit Details.

In yet another one of the embodiments summarized in FIG. 14, which may be combined with any of the embodiments referred to above, the controller 102 of the portable inspection device 100 is configured to obtain the status indication Transit Status for the transit 1 by causing automated processing of the recorded detailed operational integrity status data Transit Details of the transit elements 10, 20, 30, 40, 50 of the transit 1 by way of artificial intelligence, neural network, expert system or similar automated functionality. To facilitate the automated processing, any one of the transit reference data Transit Ref Data, the captured images or the environmental status data Transit Environment may also be considered in addition to the recorded detailed operational integrity status data Transit Details.

In still another one of the embodiments summarized in FIG. 14, which may be combined with any of the embodiments referred to above, the controller 102 of the portable inspection device 100 is configured to obtain the status indication Transit Status for the transit 1 by receiving an input via the user interface 108 from the inspector 3. Such input will represent an assessment of the overall operational integrity status of the transit 1 made by the inspector 3 based on his evaluation of the recorded detailed operational integrity status data Transit Details of the transit elements of the transit 1. To facilitate the evaluation by the inspector 3, any one of the transit reference data Transit Ref Data, the captured images or the environmental status data Transit Environment may also be made available to him for consideration in addition to the recorded detailed operational integrity status data Transit Details.

Figure 15:
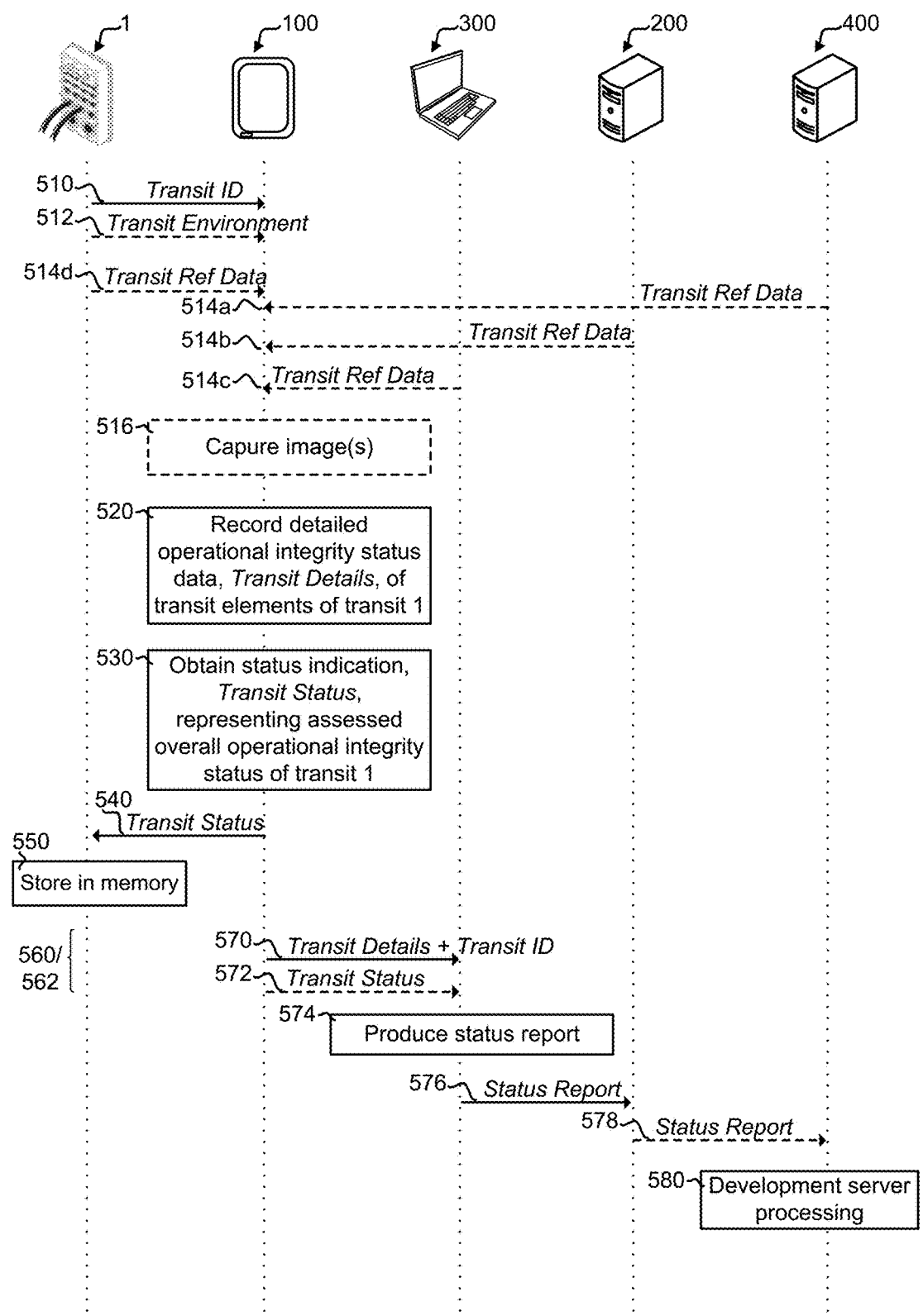
FIG. 15 is a schematic flowchart diagram for an inspection system for cable, pipe or wire transits according to yet a further embodiment.

Reference is now made to FIG. 15 which illustrates report generation functionality provided by the report generating device 300 described above with reference to FIG. 5. As seen at 560 and 562 in FIG. 15, the controller 102 of the portable inspection device 100 is configured to make at least either the recorded detailed operational integrity status data Transit Details or the obtained status indication Transit Status indirectly available to the maintenance server 1 together with the read identity Transit ID of the transit 1, by the intermediate use of the report generating device 300.

Hence, the recorded detailed operational integrity status data Transit Details and the read identity Transit ID are transmitted from the portable inspection device 100 to the report generating device 300 as seen at 570, optionally together with the obtained status indication Transit Status as seen at 572. In step 574, the report generating device 300 will produce a status report comprising the detailed operational integrity status data Transit Details, the identity Transit ID of the transit 1 and, optionally, the status indication Transit Status. The produced status report will be transmitted to the maintenance server 200 in step 576.

The maintenance server 200 may store the received status report in its database 202 and therefore facilitate for any forthcoming maintenance activity by making the received status report available to the maintenance personnel 4.

For embodiments where the status indication Transit Status is included in the received status report, the maintenance server 200 may be configured to check the status indication Transit Status and determine whether it calls for a maintenance action. A maintenance action may then be automatically triggered if the status indication Transit Status has a certain critical value, such as for instance Failed, Passed With Remark (remedy not urgent) or Failed (remedy urgent).

As seen at 578 in FIG. 15, the maintenance server 200 may be configured to make the produced status report available to the transit development server 400. This will allow development server processing 580, which will soon be described with reference to FIG. 17.

Figure 16:
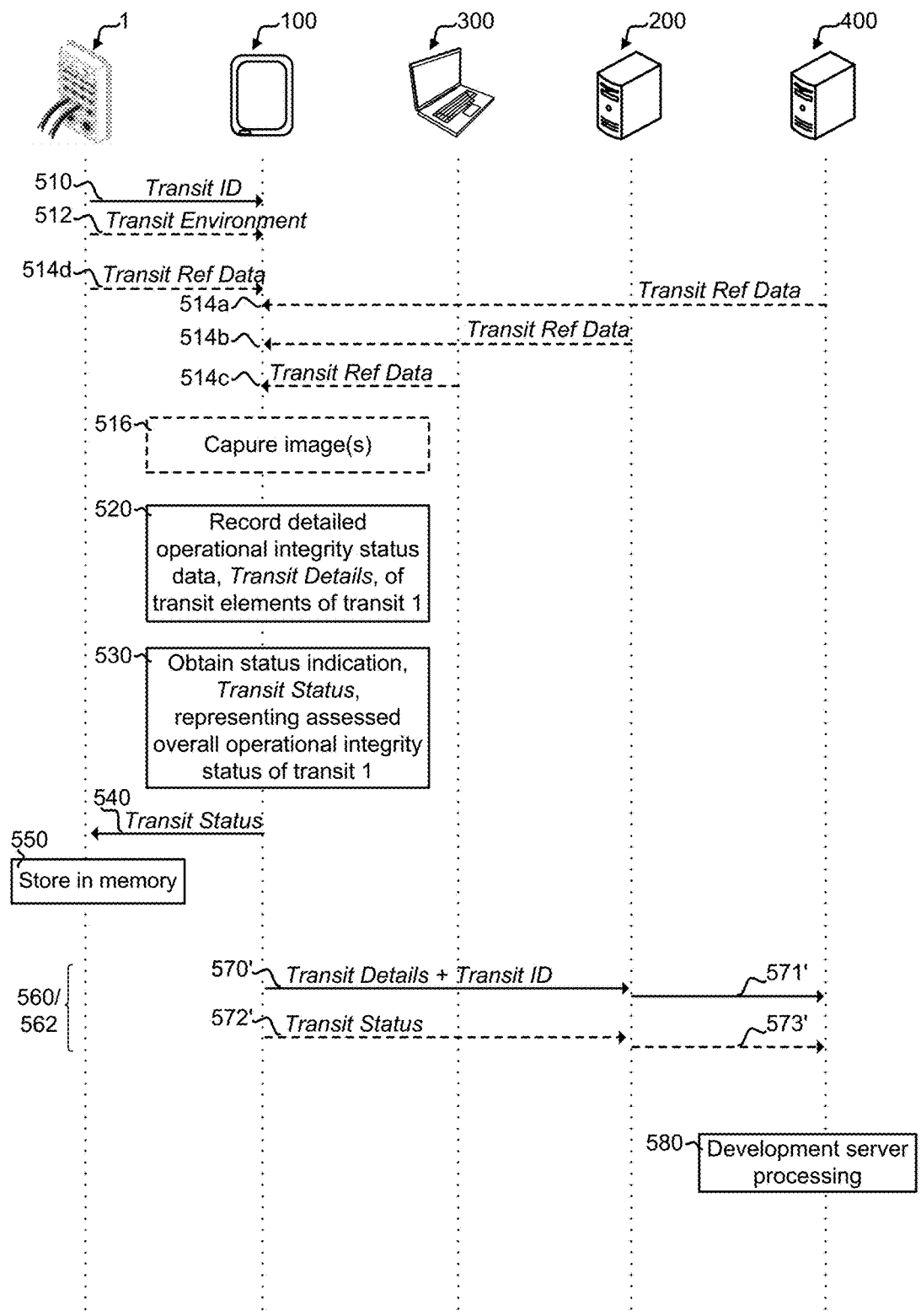
FIG. 16 is a schematic flowchart diagram for an inspection system for cable, pipe or wire transits according to still a further embodiment.

In other embodiments, for instance ones which do not include a report generating device 300, the recorded detailed operational integrity status data Transit Details and the read identity Transit ID may be transmitted from the portable inspection device 100 to the maintenance server 200 as seen at 570' in FIG. 16, optionally together with the obtained status indication Transit Status as seen at 572'. The maintenance server 200 may forward the recorded detailed operational integrity status data Transit Details and the read identity Transit ID to the transit development server 400 as seen at 571' in FIG. 16, optionally together with the obtained status indication Transit Status as seen at 573'.

Figure 17:
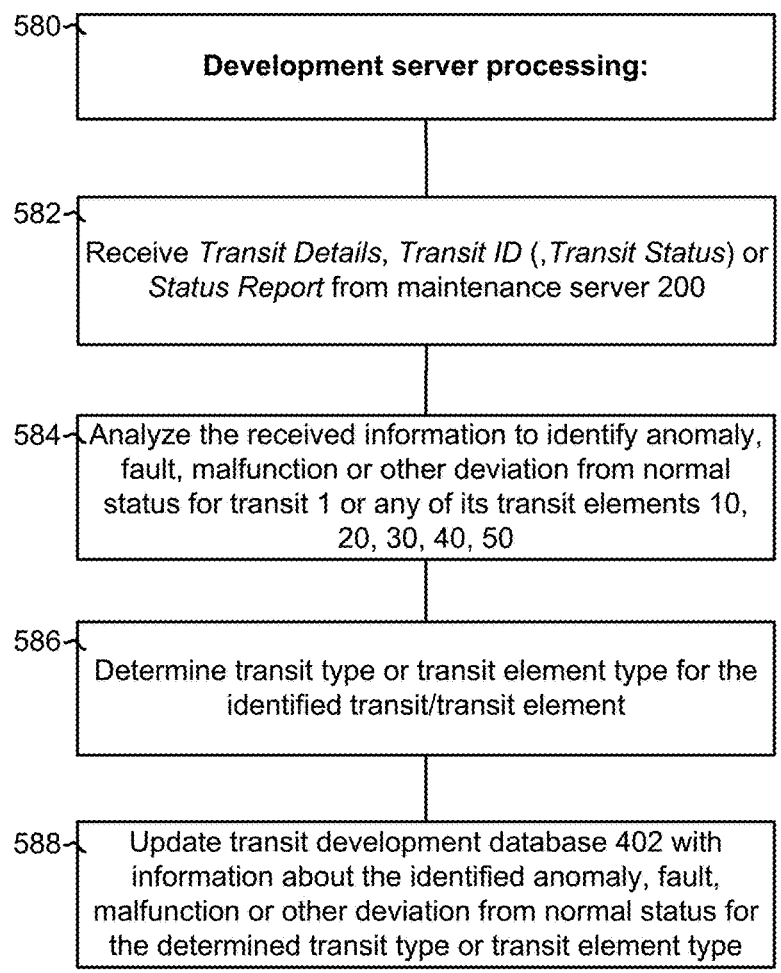
FIG. 17 is a schematic flowchart diagram illustrating the processing in a transit development server of information obtained in and by an inspection system for cable, pipe or wire transits according to embodiments of the invention.

FIG. 17 illustrates the development server processing 580 by the transit development server 400 of the information received at 578 in FIG. 15 or at 571' (and 573') in FIG. 16.

As seen in a step 582 of FIG. 17, the transit development server 400 is configured to receive the recorded detailed operational integrity status data Transit Details, the read identity Transit ID of the transit 1 and, optionally, the obtained status indication Transit Status from the maintenance server 200 as described above for FIG. 16, or receive the status report from the maintenance server 200 as described above for FIG. 15.

In a step 584, the transit development server 400 is configured to analyze the received information to identify an anomaly, fault, malfunction or other deviation from normal status of the transit 1 or any of its transit elements 10, 20, 30, 40, 50.

If an anomaly, fault, malfunction or other deviation from normal status is identified in step 584, the transit development server 400 is configured to determine a transit type or transit element type for the identified transit 1 or transit element 10, 20, 30, 40, 50, respectively, in a step 586.

In a step 588, the transit development server 400 is configured to update the transit development database 402 with information about the identified anomaly, fault, malfunction or other deviation from normal status for the determined transit type or transit element type.

As a beneficial result, the definitions of the available transit types and transit element types in the transit development database 402 will contain information which may be useful for the developer 5 when designing a transit for use at a particular site, since he may avoid selecting a certain transit type, a certain transit element type, a certain combination of transit element types, etc, in order to prevent a potential future operational problem at the site in question. Additionally or alternatively, the developer 5 may make beneficial use of the information about the identified anomaly, fault, malfunction or other deviation from normal status when developing new transit types or transit element types, and/or when redesigning existing transit types or transit element types.

The invention has been described above in detail with reference to embodiments thereof. However, as is readily understood by those skilled in the art, other embodiments are equally possible within the scope of the present invention, as defined by the appended claims.

The invention claimed is:

1. An inspection system for cable, pipe or wire transits, the inspection system comprising:
a plurality of transits, each of the plurality of transits comprising a plurality of transit elements assembled into a sealed installation of one or more cables, pipes, or wires at a site, the plurality of transit elements including one or more transit elements being constructed to be arranged around the one or more cables, pipes, or wires passing through the transit;
a portable inspection device having a controller and an RFID interface; and
a maintenance server,
wherein each of the plurality of transits further comprises an RFID chip having a memory, the memory comprising at least a first memory area and a second memory area, the first memory area for storing an identity of the transit, and
wherein the controller of the portable inspection device is configured, for a particular transit among said plurality of transits, to:
read the identity of the particular transit via the RFID interface;
record detailed operational integrity status data of the transit elements of the particular transit;
obtain a status indication representing an assessed overall operational integrity status of the particular transit based on the recorded detailed operational integrity status data of the transit elements of the particular transit, the status indication being assigned a value among a predetermined set of possible values indicative of a passed or a failed status of the particular transit;
transmit the obtained status indication via the RFID interface to the particular transit, thereby allowing storage of the status indication in the second memory area of the RFID chip in the particular transit; and
make at least either the recorded detailed operational integrity status data or the obtained status indication available to the maintenance server together with the read identity of the particular transit.

2. The inspection system for cable, pipe or wire transits as defined in claim 1, wherein the controller of the portable inspection device is configured to:
retrieve transit reference data defining each transit element and its relative position in the transit; and
use the retrieved transit reference data when recording the detailed operational integrity status data of the transit elements of the transit.

3. The inspection system for cable, pipe or wire transits as defined in claim 2, the portable inspection device further comprising a network communication interface, wherein the controller of the portable inspection device is configured to retrieve the transit reference data from a remote server.

4. The inspection system for cable, pipe or wire transits as defined in claim 3, wherein the remote server is the maintenance server.

5. The inspection system for cable, pipe or wire transits as defined in claim 3, wherein the remote server is a transit development server.

6. The inspection system for cable, pipe or wire transits as defined in claim 5,
further comprising a report generating device,
wherein the controller of the portable inspection device is configured to transmit the recorded detailed operational integrity status data, the read identity of the transit and optionally the obtained status indication to the report generating device;
wherein the report generating device is configured to produce a status report comprising the detailed operational integrity status data, the identity of the transit and optionally the status indication, and to transmit the produced status report to the maintenance server; and
wherein the maintenance server is configured to make the status report available to the transit development server.

7. The inspection system for cable, pipe or wire transits as defined in claim 5, the transit development server comprising or being associated with a transit development database, the database comprising definitions of transit types and transit element types,
wherein the maintenance server is configured to receive the recorded detailed operational integrity status data, the read identity of the transit and optionally the obtained status indication originating from the portable inspection device, and to transmit the recorded detailed operational integrity status data, the read identity of the transit and optionally the obtained status indication to the transit development server, and
wherein the transit development server is configured to:
receive the recorded detailed operational integrity status data, the read identity of the transit and optionally the obtained status indication from the maintenance server;
analyze the received information to identify an anomaly, fault, malfunction or other deviation from normal status of the transit or any of its transit elements;
determine a transit type or transit element type for the identified transit or transit element, respectively; and
update the transit development database with information about the identified anomaly, fault, malfunction or other deviation from normal status for the determined transit type or transit element type.

8. The inspection system for cable, pipe or wire transits as defined in claim 5,
the transit development server comprising or being associated with a transit development database, the database comprising definitions of transit types and transit element types,
the inspection system further comprising a report generating device,
wherein the controller of the portable inspection device is configured to transmit the recorded detailed operational integrity status data, the read identity of the transit and optionally the obtained status indication to the report generating device;
wherein the report generating device is configured to produce a status report comprising the detailed operational integrity status data, the identity of the transit and optionally the status indication, and to transmit the produced status report to the maintenance server; and
wherein the transit development server is configured to:
receive the status report from the maintenance server;
analyze the received information to identify an anomaly, fault, malfunction or other deviation from normal status of the transit or any of its transit elements;
determine a transit type or transit element type for the identified transit or transit element, respectively; and
update the transit development database with information about the identified anomaly, fault, malfunction or other deviation from normal status for the determined transit type or transit element type.

9. The inspection system for cable, pipe or wire transits as defined in claim 2, wherein the controller of the portable inspection device is configured to retrieve the transit reference data from the memory of the RFID chip via the RFID interface.

10. The inspection system for cable, pipe or wire transits as defined in claim 2, the portable inspection device further comprising a user interface, wherein the controller of the portable inspection device is configured to record the detailed operational integrity status data of the transit elements of the transit by receiving an input, for a respective one the transit elements, via the user interface from an inspector, the input representing an assessment of the current operational integrity status of the transit element made by the inspector as a result of an ocular inspection of the transit element in comparison with the transit reference data.

11. The inspection system for cable, pipe or wire transits as defined in claim 10, wherein the controller of the portable inspection device is configured to obtain the status indication for the transit by causing automated processing of the recorded detailed operational integrity status data of the transit elements of the transit by way of artificial intelligence, neural network, expert system or similar automated functionality.

12. The inspection system for cable, pipe or wire transits as defined in claim 10, wherein the controller of the portable inspection device is configured to obtain the status indication for the transit by receiving an input via the user interface from an inspector, the input representing an assessment of the overall operational integrity status of the transit by the inspector based on the recorded detailed operational integrity status data of the transit elements of the transit.

13. The inspection system for cable, pipe or wire transits as defined in claim 2, the portable inspection device further comprising a camera and a user interface,
wherein the controller of the portable inspection device is configured to capture one or more images of the transit, and use the captured images when recording the detailed operational integrity status data of the transit elements of the transit and/or when obtaining the status indication, and
wherein the controller of the portable inspection device is configured to record the detailed operational integrity status data of the transit elements of the transit by receiving an input, for a respective one the transit elements, via the user interface from an inspector, the input representing an assessment of the current operational integrity status of the transit element made by the inspector as a result of an ocular inspection of the transit element in comparison with the transit reference data and also based on the captured images of the transit.

14. The inspection system for cable, pipe or wire transits as defined in claim 13, wherein the controller of the portable inspection device is configured to obtain the status indication for the transit by causing automated processing of the recorded detailed operational integrity status data of the transit elements of the transit by way of artificial intelligence, neural network, expert system or similar automated functionality.

15. The inspection system for cable, pipe or wire transits as defined in claim 13, wherein the controller of the portable inspection device is configured to obtain the status indication for the transit by receiving an input via the user interface from an inspector, the input representing an assessment of the overall operational integrity status of the transit by the inspector based on the recorded detailed operational integrity status data of the transit elements of the transit.

16. The inspection system for cable, pipe or wire transits as defined in claim 2,
the RFID chip of the transit further comprising or being connected with a sensor being adapted to provide environmental status data for the transit, and
the portable inspection device further comprising a user interface,
wherein the controller of the portable inspection device is configured to retrieve the environmental status data from the transit via the RFID interface, and use the retrieved environmental status data when recording the detailed operational integrity status data of the transit elements of the transit and/or when obtaining the status indication, and
wherein the controller of the portable inspection device is configured to record the detailed operational integrity status data of the transit elements of the transit by receiving an input, for a respective one the transit elements, via the user interface from an inspector, the input representing an assessment of the current operational integrity status of the transit element made by the inspector as a result of an ocular inspection of the transit element in comparison with the transit reference data and also based on the retrieved environmental status data.

17. The inspection system for cable, pipe or wire transits as defined in claim 16, wherein the controller of the portable inspection device is configured to obtain the status indication for the transit by causing automated processing of the recorded detailed operational integrity status data of the transit elements of the transit by way of artificial intelligence, neural network, expert system or similar automated functionality.

18. The inspection system for cable, pipe or wire transits as defined in claim 16, wherein the controller of the portable inspection device is configured to obtain the status indication for the transit by receiving an input via the user interface from an inspector, the input representing an assessment of the overall operational integrity status of the transit by the inspector based on the recorded detailed operational integrity status data of the transit elements of the transit.

19. The inspection system for cable, pipe or wire transits as defined in claim 1, the portable inspection device further comprising a camera, wherein the controller of the portable inspection device is configured to:
 capture one or more images of the transit; and
 use the captured images when recording the detailed operational integrity status data of the transit elements of the transit and/or when obtaining the status indication.

20. The inspection system for cable, pipe or wire transits as defined in claim 19,
 wherein the controller of the portable inspection device is configured to retrieve transit reference data defining each transit element and its relative position in the transit, and use the retrieved transit reference data when recording the detailed operational integrity status data of the transit elements of the transit; and
 wherein the controller of the portable inspection device is configured to record the detailed operational integrity status data of the transit elements of the transit by causing automated processing of the retrieved transit reference data and the captured images of the transit by way of artificial intelligence, neural network, expert system or similar automated functionality.

21. The inspection system for cable, pipe or wire transits as defined in claim 20, wherein the controller of the portable inspection device is configured to obtain the status indication for the transit by causing automated processing of the recorded detailed operational integrity status data of the transit elements of the transit by way of artificial intelligence, neural network, expert system or similar automated functionality.

22. The inspection system for cable, pipe or wire transits as defined in claim 20, the portable inspection device comprising a user interface, wherein the controller of the portable inspection device is configured to obtain the status indication for the transit by receiving an input via the user interface from an inspector, the input representing an assessment of the overall operational integrity status of the transit by the inspector based on the recorded detailed operational integrity status data of the transit elements of the transit.

23. The inspection system for cable, pipe or wire transits as defined in claim 1, the RFID chip of the transit further comprising or being connected with a sensor being adapted to provide environmental status data for the transit, wherein the controller of the portable inspection device is configured to:
 retrieve the environmental status data from the transit via the RFID interface; and
 use the retrieved environmental status data when recording the detailed operational integrity status data of the transit elements of the transit and/or when obtaining the status indication.

24. The inspection system for cable, pipe or wire transits as defined in claim 23, wherein the sensor is adapted to detect one or more of the following environmental parameters:
 pressure;
 temperature;
 smoke;
 moisture; and
 gas.

25. The inspection system for cable, pipe or wire transits as defined in claim 23, the RFID chip of the transit further comprising a controller wherein the controller is configured to:
 receive measurement data from the sensor;
 process the measurement data to categorize the measurement data into one of a plurality of different categories; and
 store the result of the processing comprised in said environmental status data in a third memory area of the memory of the RFID chip.

26. The inspection system for cable, pipe or wire transits as defined in claim 23, the RFID chip of the transit further comprising a controller and a real-time clock, wherein the controller is configured to:
 receive measurement data from the sensor; and
 store the measurement data together with temporal data from the real-time clock comprised in said environmental status data in a third memory area of the memory of the RFID chip.

27. The inspection system for cable, pipe or wire transits as defined in claim 23,
 wherein the controller of the portable inspection device is configured to retrieve transit reference data defining each transit element and its relative position in the transit, and use the retrieved transit reference data when recording the detailed operational integrity status data of the transit elements of the transit; and
 wherein the controller of the portable inspection device is configured to record the detailed operational integrity status data of the transit elements of the transit by causing automated processing of the retrieved transit reference data and the retrieved environmental status data by way of artificial intelligence, neural network, expert system or similar automated functionality.

28. The inspection system for cable, pipe or wire transits as defined in claim 27, wherein the controller of the portable inspection device is configured to obtain the status indication for the transit by causing automated processing of the recorded detailed operational integrity status data of the transit elements of the transit by way of artificial intelligence, neural network, expert system or similar automated functionality.

29. The inspection system for cable, pipe or wire transits as defined in claim 27, the portable inspection device comprising a user interface, wherein the controller of the portable inspection device is configured to obtain the status indication for the transit by receiving an input via the user interface from an inspector, the input representing an assessment of the overall operational integrity status of the transit by the inspector based on the recorded detailed operational integrity status data of the transit elements of the transit.

30. The inspection system for cable, pipe or wire transits as defined in claim 1, further comprising a report generating device,
 wherein the controller of the portable inspection device is configured to transmit the recorded detailed operational integrity status data, the read identity of the transit and optionally the obtained status indication to the report generating device; and
 wherein the report generating device is configured to produce a status report comprising the detailed operational integrity status data, the identity of the transit and optionally the status indication, and to transmit the produced status report to the maintenance server.

31. The inspection system for cable, pipe or wire transits as defined in claim 1,
wherein the maintenance server is configured to receive the recorded detailed operational integrity status data, the read identity of the transit and optionally the obtained status indication originating from the portable inspection device, and to transmit the recorded detailed operational integrity status data, the read identity of the transit and optionally the obtained status indication to the transit development server.

32. The inspection system for cable, pipe or wire transits as defined in claim 1, wherein each transit element is any one of the following:
a frame,
a compressible module,
a stayplate;
a wedge or compression unit;
a wedge clip.

* * * * *

UNITED STATES PATENT AND TRADEMARK OFFICE
CERTIFICATE OF CORRECTION

| | |
|---|---|
| PATENT NO. | : 11,237,026 B2 |
| APPLICATION NO. | : 15/555012 |
| DATED | : February 1, 2022 |
| INVENTOR(S) | : Jens Bohlin, Jörgen Landqvist and Ulf Hildingsson |

It is certified that error appears in the above-identified patent and that said Letters Patent is hereby corrected as shown below:

In the Drawings

At Sheet 9 of 14, (Reference Numeral 516) (FIG. 11), delete "Capure" and insert --Capture--.

At Sheet 11 of 14, (Reference Numeral 516) (FIG. 13), delete "Capure" and insert --Capture--.

At Sheet 12 of 14, (Reference Numeral 582) (FIG. 17), delete "(,Transit" and insert --(Transit--.

At Sheet 13 of 14, (Reference Numeral 516) (FIG. 15), delete "Capure" and insert --Capture--.

At Sheet 14 of 14, (Reference Numeral 516) (FIG. 16), delete "Capure" and insert --Capture--.

In the Specification

At Column 11, Line 20, delete "one the" and insert --one of the--.

In the Claims

At Column 15, Line 44, delete "one the" and insert --one of the--.

At Column 16, Line 10, delete "one the" and insert --one of the--.

At Column 16, Line 52, delete "one the" and insert --one of the--.

Signed and Sealed this
Fifth Day of July, 2022

Katherine Kelly Vidal
*Director of the United States Patent and Trademark Office*